United States Patent
Guo et al.

(10) Patent No.: US 10,614,554 B2
(45) Date of Patent: Apr. 7, 2020

(54) CONTRAST ADAPTIVE VIDEO DENOISING SYSTEM

(71) Applicant: Beijing SmartLogic Technology Ltd., YanCun Town (CN)

(72) Inventors: Ruoshan Guo, Beijing (CN); Lu Ye, Beijing (CN); Rui Han, Beijing (CN); Renjun Tang, Beijing (CN); Yang Luo, Beijing (CN); Fengli Yan, Beijing (CN); Xiaoli Tang, Beijing (CN)

(73) Assignee: Beijing SmartLogic Technology Ltd., YanCun Town (CN)

(*) Notice: Subject to any disclaimer, the term of this patent is extended or adjusted under 35 U.S.C. 154(b) by 164 days.

(21) Appl. No.: 15/557,082

(22) PCT Filed: Apr. 16, 2015

(86) PCT No.: PCT/CN2015/076783
§ 371 (c)(1),
(2) Date: Sep. 9, 2017

(87) PCT Pub. No.: WO2016/165112
PCT Pub. Date: Oct. 20, 2016

(65) Prior Publication Data
US 2018/0061014 A1 Mar. 1, 2018

(51) Int. Cl.
*G06K 9/40* (2006.01)
*G06T 5/00* (2006.01)
(Continued)

(52) U.S. Cl.
CPC ............... *G06T 5/002* (2013.01); *G06T 5/20* (2013.01); *G06T 7/20* (2013.01); *H04N 5/21* (2013.01);
(Continued)

(58) Field of Classification Search
CPC .. G06T 5/002; G06T 7/20; G06T 5/20; G06T 2207/20201; G06T 2207/20182
See application file for complete search history.

(56) References Cited

U.S. PATENT DOCUMENTS 6,061,100 A 5/2000 Ward et al.
2006/0139494 A1 6/2006 Zhou et al.
(Continued)

FOREIGN PATENT DOCUMENTS

| CN | 102132554 A | 7/2011 |
|---|---|---|
| CN | 103024248 A | 4/2013 |
| CN | 104767913 A | 7/2015 |

OTHER PUBLICATIONS

Reference-A (Pub. No. CN103024248; "Motion-adaptive video image denoising method and device") (Year: 2013).*
PCT/CN2015/076783 International Search Report.

*Primary Examiner* — Solomon G Bezuayehu
(74) *Attorney, Agent, or Firm* — Maier & Maier, PLLC (57) ABSTRACT

The present invention discloses a contrast adaptive video denoising system, which comprises a frame memory for buffering the filtered frame; an inter-frame difference calculating module for inter-frame difference of the current input frame of the video and a previous filtered frame in the frame memory; a contrast calculating module for calculating the local contrast of the current input frame and inputting it into a low-contrast region detection module, a calculated low-contrast region confidence together with the inter-frame difference are input into a motion detection module to calculate the motion probability for each pixel. The motion adaptive temporal filtering module performs motion adaptive temporal filtering by using the current input frame of the video and the previous filtered frame in the frame memory as well as the motion probability of each pixel, and finally outputs the current filtered frame to store in the frame
(Continued)

memory. Said system can solve the problems of motion tailing and blurring caused by conventional video denoising systems when processing low-contrast motion videos.

10 Claims, 7 Drawing Sheets

(51) Int. Cl.
    *H04N 5/21*          (2006.01)
    *G06T 5/20*          (2006.01)
    *G06T 7/20*          (2017.01)

(52) U.S. Cl.
    CPC ............... *G06T 2207/20182* (2013.01); *G06T 2207/20201* (2013.01)

(56) References Cited

U.S. PATENT DOCUMENTS

| | | | | |
|---|---|---|---|---|
| 2008/0062309 A1* | 3/2008 | Zhai | ...................... | G06T 3/4084 348/452 |
| 2010/0277647 A1* | 11/2010 | Tanigawa | ................. | H04N 5/21 348/607 |
| 2012/0275710 A1* | 11/2012 | Peng | ...................... | H04N 5/213 382/199 |

* cited by examiner

CONTRAST ADAPTIVE VIDEO DENOISING SYSTEM

TECHNICAL FIELD

The present invention relates to the technical field of video processing, in particular to the technical field of performing temporal noise reduction on videos.

BACKGROUND

Image capturing devices (CMOS, CCD sensor) are usually influenced by noises during image capturing, which results in random noise in the videos, and noises are even more serious especially at low illumination conditions. Therefore, it is necessary to remove noises by means of video denoising technologies. In addition, with the development of mobile internet and as videos are becoming more and more multi-sourced, various video sources comprising internet videos shot by handheld devices need to be displayed on display terminal devices such as a television. However, owing to the limited area of the sensors of cameras in the handheld mobile devices, the imaging quality of handheld mobile devices is not good and the noise is more serious as compared to large-area sensors of professional camera devices, so video denoising technologies become particularly important.

Figure 1:
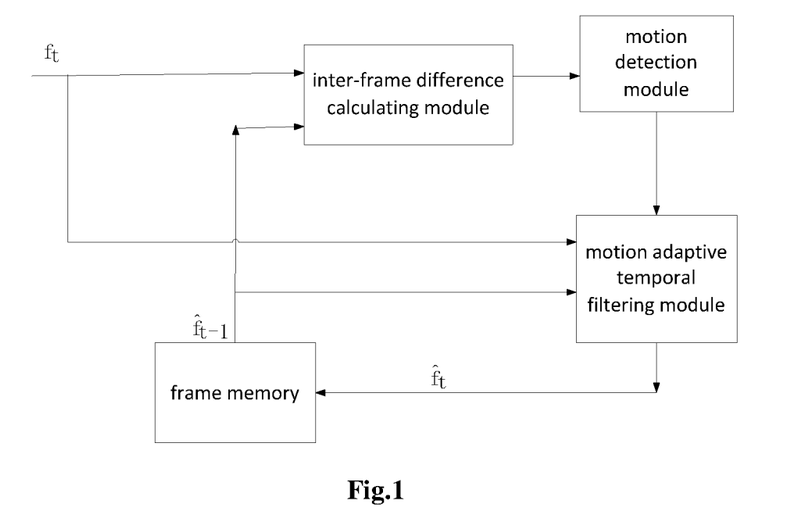
FIG. 1 is a block diagram of a conventional temporal noise reduction system for videos.

Video noise reduction technology includes spatial noise reduction and temporal noise reduction technologies, wherein the spatial noise reduction technology includes the simple spatial filtering, such as mean filtering and median filtering, which will usually result in blurring of details, while the temporal noise reduction technology can better protect details, so it is more widely used in the industry. A conventional temporal noise reduction method is as shown in FIG. 1, wherein an inter-frame difference is calculated from a current input frame and a previous filtered frame; the inter-frame difference is then compared with a threshold to perform motion detection, that is, pixels whose inter-frame difference is greater than a threshold are motion pixels, and pixels whose inter-frame difference is smaller than the threshold are still pixels; then the temporal filtering between the current input frame and the previous filtered frame is performed based on the result of motion detection. If it is a still region, multi-frame weighted temporal filtering is performed to achieve the effect of denoising, and if it is a motion region, then no temporal filtering is performed.

Generally, two types of error occur in motion detection. One type of error is missed detection, i.e. a moving pixel is determined as a still pixel, which will cause the multi-frame weighted temporal filtering to be performed on the motion region, resulting in tailing of a moving object or motion blurring. The other type of error is false alarm, i.e. a still pixel is erroneously identified as a moving pixel, which will cause that no temporal filtering is performed on the still region, thus noises in the still region cannot be removed. If the threshold for motion detection is high, the error of missed detection will easily occur; and if the threshold for motion detection is low, the error of false alarm will easily occur.

Conventional motion detection methods, such as the methods proposed in patents U.S. Pat. Nos. 7,903,179B2, 6,061,100 and US 2006/0139494A1, usually use a predefined global threshold or a noise level adaptive global threshold to perform motion detection. For example, in patent U.S. Pat. No. 6,061,100, a two times noise level is used as the threshold for motion detection, and if the inter-frame difference is less than the two times noise level, the pixel is a still pixel; otherwise, the pixel is a moving pixel. This motion detection method usually only considers the statistical distribution of the still pixel, and when the noise is white noise and Gaussian, it will ensure that more than 95% still pixels will not be detected as moving pixels, that is, the rate of occurrence of the second type of error, i.e. false alarm, is below 5%, but the rate of occurrence of the first type error, i.e. missed detection, cannot be controlled. For a motion video with low contrast (i.e. a video in which the difference between the brightness of the motion target and the brightness of the background is small), such a threshold selection method will result in a lot of missed detection, i.e. many motion regions are not detected, thus moving object tailing and motion blurring will occur during temporal filtering, which are more serious problems than un-removed noises in terms of subjective image quality.

Therefore, it is necessary to solve the problem concerning how to control the error of missed detection in the low-contrast region at the same time so that moving object tailing and motion blurring will not occur in the low contrast region.

SUMMARY OF THE INVENTION

To avoid the error of missed detection in the low-contrast region so that moving target tailing and motion blurring will not occur in the low contrast region, the present invention provides a contrast adaptive video denoising system, which can achieve better denoising effect and ensure the clarity of the video.

To achieve the above object, the present invention proposes a contrast adaptive video denoising system, which comprises a frame memory, an inter-frame difference calculating module, a motion detection module, a motion adaptive temporal filtering module, and which further comprises a contrast calculating module and a low-contrast region detection module; the contrast calculating module calculates and outputs a local contrast C of the current frame I; the low-contrast region detection module calculates and outputs a low-contrast region confidence R_LC according to the local contrast C of the current frame I; the motion detection module calculates and outputs a motion probability R_Motion of a pixel according to the low-contrast region confidence R_LC and the inter-frame difference output from the inter-frame difference calculating module.

The contrast calculating module comprises a horizontal gradient calculating unit, a gradient threshold calculating unit, a transitional zone detection unit, a left mean calculating unit, a right mean calculating unit, and an absolute difference calculating unit; the horizontal gradient calculating unit is to calculate the horizontal gradient image G of the current frame I; the gradient threshold calculating unit calculates and outputs a gradient threshold Gt according to the horizontal gradient image G; the transitional zone detection unit calculates and outputs a non-transitional zone identifier a of the pixel be detected according to the horizontal gradient image G and the gradient threshold Gt, and divides a local window around the pixel to be detected into a left window and a right window; the left mean calculating unit calculates and outputs a gray scale mean left_mean of pixels in the non-transitional zone in the left window according to the current frame and the non-transitional zone identifier a; the right mean calculating unit calculates and outputs a gray scale mean right_mean of pixels in the non-transitional zone in the right window according to the current input frame and the non-transitional zone identifier a;

the absolute difference calculating unit calculates and outputs an absolute value of a difference between the gray scale mean left_mean of pixels in the non-transitional zone in the left window and the gray scale mean right_mean of pixels in the non-transitional zone in the right window to be used as the local contrast C of the current input frame I.

The present invention provides a contrast adaptive motion detection system that calculates the local contrast so as to adaptively determine parameters for motion detection according to the contrast, thus the following advantageous effects are achieved:

(1) for a low-contrast motion video or a moving object region having a low contrast in a video, occurrence of the error of missed detection can be effectively controlled, thereby avoiding tailing of moving objects under a low contrast;

(2) for a high-contrast motion video or a high-contrast region in a video, occurrence of the error of false alarm can be effectively controlled, thereby ensuring good denoising effect in said video or region.

DETAILED DESCRIPTION OF THE INVENTION

For the purpose of having the object, technical solutions and advantages of the present invention more apparently for those skilled in the art, the present invention will be described in detail below in conjunction with specific embodiments and with reference to the drawings.

1. Analysis of Statistical Distribution of Moving Pixels and Still Pixels

In the conventional technologies, such as patents US 2006/0139494A1 and U.S. Pat. No. 6,061,100, the motion detection method adopted only takes the statistical distribution of still pixels into consideration, so it cannot control occurrence of the error of missed detection. In order to control the error of missed detection, the present invention makes the following analysis to the statistical distribution of moving pixels, from which the influence to motion detection caused by the brightness difference (i.e. contrast) between the moving object and the background can be seen quantitatively.

Figure 2A:
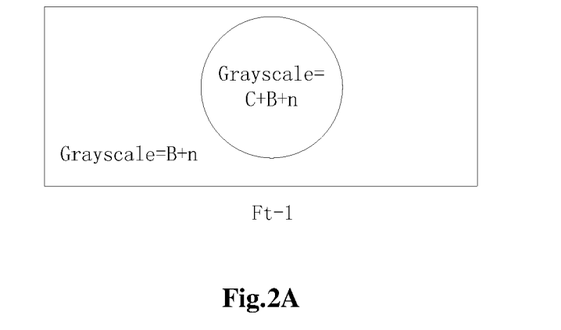
FIG. 2A shows the ideal model of an image with a moving object at time t−1 for distribution analysis of the moving pixel in accordance with the present embodiment.
Figure 2B:
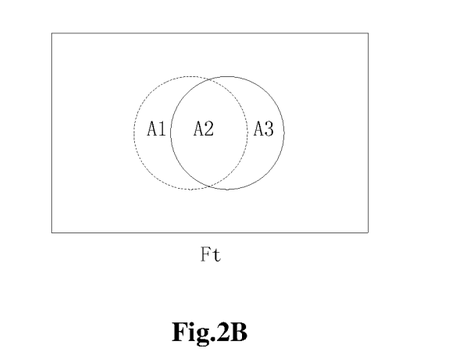
FIG. 2B shows the ideal model of an image with a moving object at time t for distribution analysis of the moving pixel in accordance with the present embodiment.

As shown in FIGS. 2A and 2B, the moving object is the circle in FIG. 2A. Suppose that the gray scale of the background is B, the gray scale difference, i.e. the contrast, between the moving object and the background is C, and the noise is n, then when noise exists, the gray scale of the moving object is C+B+n, and the surrounding white region is the background, whose gray scale is B+n, the noise n is zero-mean Gaussian noise with noise variance $\sigma_g^2$, i.e. n~N(0, $\sigma_g^2$), FIG. 2A is an image of the video at time t−1, FIG. 2B is an image of the video at time t. The moving object moves.

Suppose that the image gray scale at time t is $g_t$, and the image gray scale at time t−1 is $g_{t-1}$, then an inter-frame pixel difference d in the motion region, i.e. in region A3 of FIG. 2B, is distributed as follows:

$$g^{t-1} = C + B + n \quad (1)$$

$$g^t = B + n \quad (2)$$

$$d = g^t - g^{t-1} \quad (3)$$

and the distribution of d is:

$$d \sim N(C, \sigma_d^2), \sigma_d^2 = 2\sigma_g^2 \quad (4)$$

Set y=|d|, then an absolute difference y of the inter-frame pixel has a distribution of $$p(y) = \frac{1}{\sqrt{2\pi}\,\sigma_d} e^{-\frac{(y-c)^2}{2\sigma_d^2}} + \frac{1}{\sqrt{2\pi}\,\sigma_d} e^{-\frac{(y+c)^2}{2\sigma_d^2}}, y > 0 \quad (5)$$

the mean value of y is $$E(y) = \frac{2}{\sqrt{\pi}} \sigma_g e^{-\frac{c^2}{4\sigma_g^2}} + c\left(2\phi\left(\frac{c}{\sqrt{2}\,\sigma_g}\right) - 1\right) \quad (6)$$

The variance of y is:

$$\sigma_y^2 = E(y^2) - (E(y))^2 = \sigma_d^2 - (E(y))^2 \quad (7)$$

When performing the motion detection, usually a local mean value (Mean Absolute Error, MAE) of the absolute difference y of the inter-frame pixel is used as the feature for motion detection, and the calculation of said MAE(m) is as shown by formula (8)

$$m = \frac{y_1 + y_2 + \ldots + y_k}{k} \quad (8)$$

$y_1, \ldots y_k$ are absolute differences y of the inter-frame pixels of locally adjacent k pixels, the distribution of m has the same mean value as y, and the variance thereof is 1/k of the variance of y, namely $$E(m) = E(y) = \frac{2}{\sqrt{\pi}} \sigma_g e^{-\frac{c^2}{4\sigma_g^2}} + c\left(2\phi\left(\frac{c}{\sqrt{2}\,\sigma_g}\right) - 1\right) \quad (9)$$

$$\sigma_m^2 = \sigma_y^2 / k \quad (10)$$

As for pixels in the still region (region A2 of the image at time t as shown in FIG. 2B), the distribution of the MAE characteristic thereof is a special case of C=0 for formulae (9) and (10):

$$E(m) = \frac{2}{\sqrt{\pi}} \sigma_g \quad (11)$$

$$\sigma_m^2 = \frac{2(\pi-2)}{\pi k} \sigma_g^2 \quad (12)$$

Figure 3A:
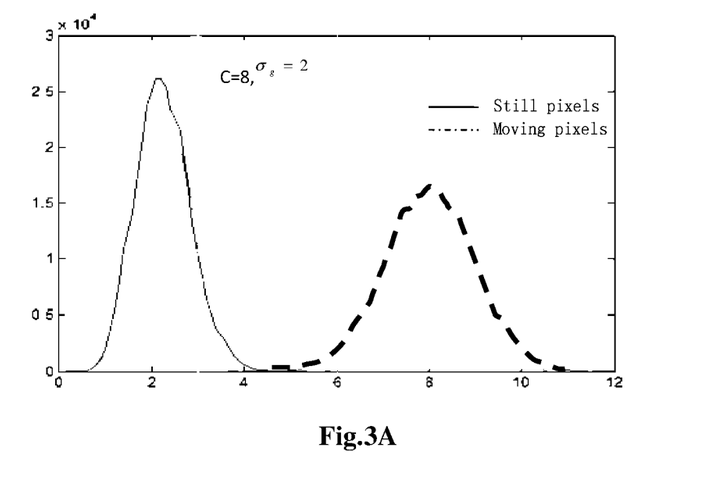
FIG. 3 shows examples of the distribution of MAE of still pixels and moving pixels.
Figure 3B:
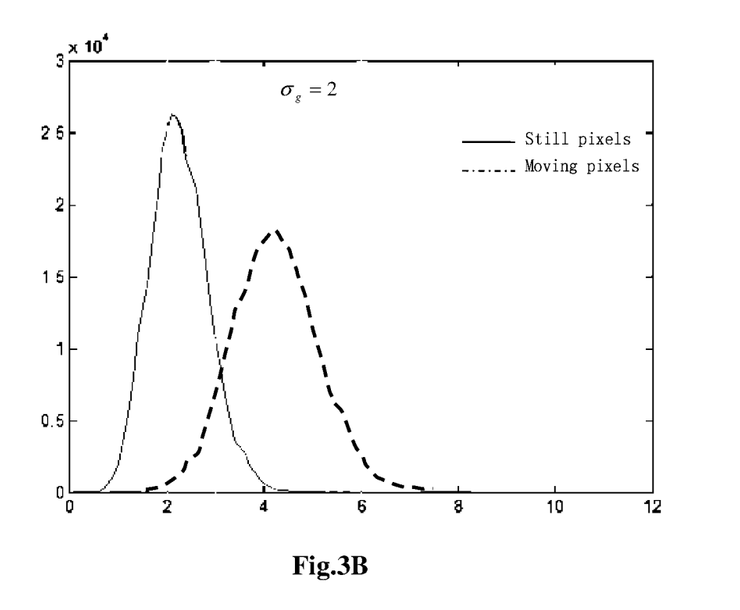

From the MAE characteristic distribution of the moving pixels as determined by formulae (9) and (10) and from the MAE distribution of the still pixels as determined by formulae (11) and (12), a distribution curve can be obtained when C=8, $\sigma_g=2$, as shown in FIG. 3A, and a distribution curve can be obtained when C=4, $\sigma_g=2$, as shown in FIG. 3B.

It can be seen from FIGS. 3A and 3B that when the noise levels are the same $\sigma_g=2$, and when the contrast C is 8, the MAE distributions of the moving pixels and the still pixels substantially do not have any overlapping region, and they have good classifiability, but when the contrast C falls to 4, the MAE distribution of the moving pixels already has a large overlapping region with the MAE distribution of the still pixels.

Suppose that the relationship between the contrast C and the noise level $\sigma_g$ is $$C = x\sigma_g \quad (13)$$

x is a contrast-to-noise ratio, and it is obtained through a lot of data analysis that when x>3, i.e. the contrast is larger than 3 times the noise level, the MAE distributions of the moving pixels and still pixels have a small overlapping region, and they have good classifiability; and when x<3, the overlapping region gradually increase with the decrease of x, and the classifiability declines.

2. Contrast Adaptive Video Denoising System

It can be seen from the above analysis that when the contrast-to-noise ratio x is small, if a threshold is used to perform the motion detection, then no matter how the threshold is selected, detection errors will occur. If the threshold is small, missed detection will occur, and if the threshold is large, false alarm will occur. However, since the distortion of moving object tailing caused by missed detection looks worse to human eyes than the phenomenon of unremoved noise caused by false alarm, the motion detection should avoid missed detection as far as possible in the case of low contrast in order to achieve better visual effect. To this end, the present invention provides a contrast adaptive video denoising system to solve said problem.

3. Descriptions of the Contrast Adaptive Video Denoising System

Figure 4:
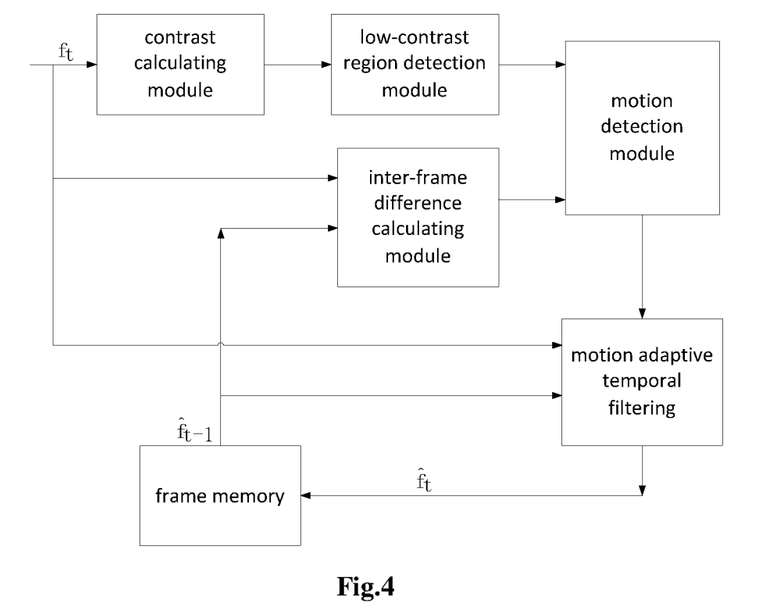
FIG. 4 is a block diagram of a contrast adaptive video denoising system in accordance with the present embodiment.

The contrast adaptive video denoising system in accordance with the present embodiment is as shown in FIG. 4. Said system comprises: a frame memory, an inter-frame difference calculating module, a contrast calculating module, a low-contrast region detection module, a motion detection module, a motion adaptive temporal filtering module. The frame memory is configured for buffering the filtered frame. The inter-frame difference calculating module calculates and outputs inter-frame difference according to a current input frame of the video and a previous filtered frame in the frame memory. The contrast calculating module calculates and outputs a local contrast of the current input frame. The low-contrast region detection module calculates and outputs a low-contrast region confidence according to the local contrast of the current frame. The motion detection module calculates and outputs a motion probability of a pixel according to the low-contrast region confidence and the inter-frame difference from the inter-frame difference calculating module. The motion adaptive temporal filtering module performs motion adaptive temporal filtering according to the current input frame of the video and the previous filtered frame in the frame memory as well as the motion probability of each pixel and finally outputs a current filtered frame to store in the frame memory.

The inter-frame difference calculating module calculates inter-frame difference of the current input frame of the video and the previous filtered frame in the frame memory. Many methods for inter-frame difference calculation can be employed, such as simple difference, absolute difference, Sum of Absolute Difference (SAD), Mean Absolute Error (MAE). The inter-frame difference used in this embodiment is the MAE, as defined by formula (8).

Figure 5A:
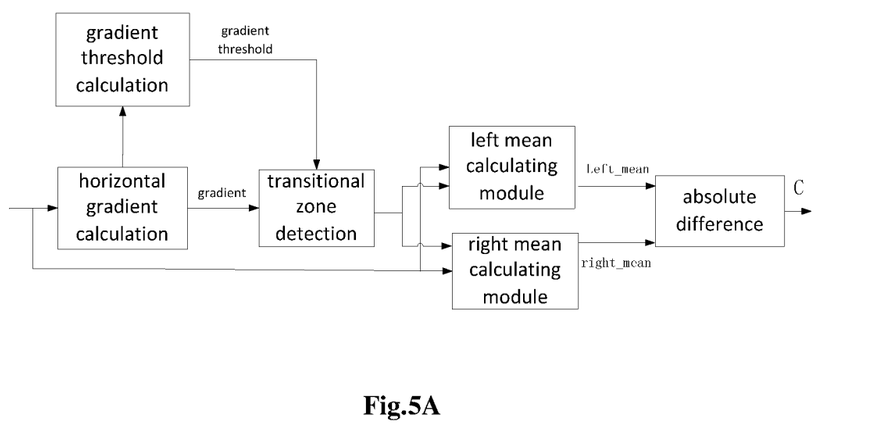
FIG. 5A is a block diagram of a contrast calculating module in accordance with the present embodiment.

The contrast calculating module is as shown in FIG. 5A, which comprises a horizontal gradient calculating unit, a gradient threshold calculating unit, a transitional zone detection unit, a left mean calculating unit, a right mean calculating unit, and an absolute difference calculating unit.

The horizontal gradient calculating unit is to calculate a horizontal gradient image G of the current frame I. The gradient threshold calculating unit calculates and outputs a gradient threshold Gt according to the horizontal gradient image G. The transitional zone detection unit calculates and outputs a non-transitional zone identifier a of the pixel to be detected according to the horizontal gradient image G and the gradient threshold Gt, and divides a local window around the pixel to be detected into a left window and a right window. The left mean calculating unit calculates and outputs a gray scale mean left_mean of pixels in the non-transitional zone in the left window according to the current frame and the non-transitional zone identifier a. The right mean calculating unit calculates and outputs a gray scale mean right_mean of pixels in the non-transitional zone in the right window according to the current frame and the non-transitional zone identifier a. The absolute difference calculating unit calculates and outputs an absolute value of a difference between the gray scale mean left_mean of pixels in the non-transitional zone in the left window and the gray scale mean right_mean of pixels in the non-transitional zone in the right window to be used as the local contrast C of the current frame.

Figure 5B:
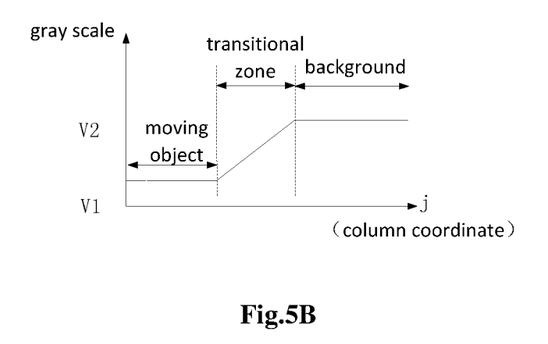
FIG. 5B shows the correspondence between the column coordinate j and the gray scale of pixels on a horizontal line that goes across the border of the moving object and the background.

To facilitate understanding of the contrast calculating method of the present invention, the method will now be described in detail. FIG. 5B shows the correspondence between the column coordinate j (i.e. j represents the horizontal coordinate of a pixel) and the gray scale of pixels on a horizontal line that goes across the border of the moving object and the background. The gray scale of the moving object is V1, the gray scale of the background is V2, and a certain transitional zone exists between the moving object and the background. The contrast between the moving object and the background is C=V2−V1.

Figure 5C:
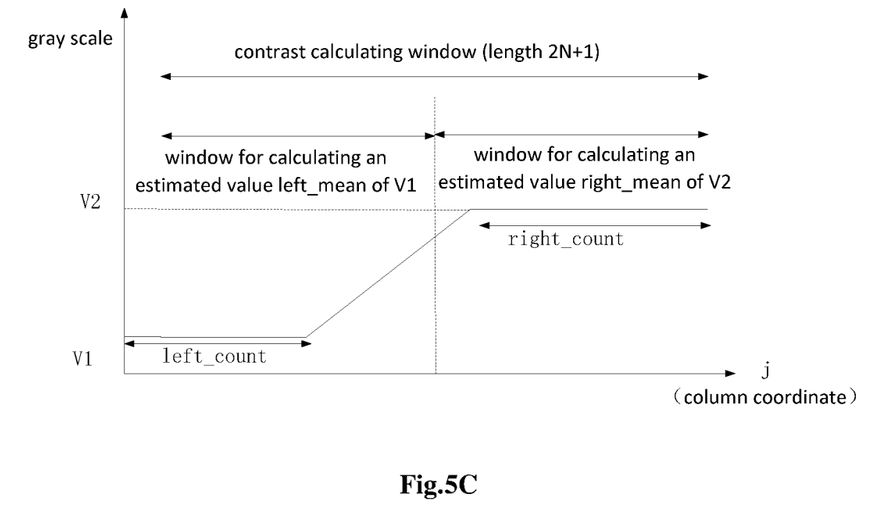
FIG. 5C is a schematic drawing of a contrast calculating method in accordance with the present embodiment.

In order to calculate C, it is necessary to estimate V1 and V2. Specifically as shown in FIG. 5(C), suppose that a contrast calculating window for pixel (i,j) to be detected in the current frame I is (2N+1)×1, and the coordinates of the pixels in the window are represented by (i, j+n), pixels with −N≤n≤0 are pixels in the left window, and pixels with $1 \leq n \leq N$ are pixels in the right window; then V1 is estimated using a mean value of pixels in the left window, and V2 is estimated using a mean value of pixels in the right window. Since both the left window and the right window have certain transitional zones, and the gray scale of pixels in said transitional zones will influence correct estimation of V1 and V2, if the mean values are calculated after removing pixels in the transitional zones the estimation of V1 and V2 will be closer to the correct values thereof. The specific steps for calculating the local contrast C of the current frame I in the contrast calculating module are as follows:

Step 11: calculating the horizontal gradient image G

The horizontal gradient may be calculated by a gradient operator and image convolution, and a Sobel gradient operator of 3×3 is adopted in this embodiment Step 12: calculating the gradient threshold Gt The method of calculating the gradient threshold Gt at the position (i,j) of the pixel to be detected is: taking a local window of (2N+1)×1 around the pixel (i, j), and calculating a maximum gradient max_grad and a gradient threshold Gt of the local window, as shown by formulae (14) and (15)

$$\text{max\_grad}(i,j) = \max_{j-N \leq n \leq j+M} G(i,n) \quad (14)$$

$$Gt(i,j) = W * \text{max\_grad}(i,j) \quad (15)$$

wherein W is a scale factor of the maximum gradient, and W can be 0.7.

Step 13: performing transitional zone detection based on the horizontal gradient image G and gradient threshold Gt, and calculating the non-transitional zone identifier a of the local window (2N+1)×1 of the pixel (i,j) to be detected $$\alpha_n = \begin{cases} 1 & \text{if } G(i, j+n) < G_t(i, j) \\ 0 & \text{if } G(i, j+n) \geq G_t(i, j) \end{cases} \quad (16)$$

Namely, when the gradient G of a pixel in the local window is smaller than the gradient threshold Gt, said pixel is a pixel in the non-transitional zone.

Step 14: calculating a gray scale mean left_mean of pixels in the non-transitional zone in the left window by using the current frame I and the non-transitional zone identifier a.

In the local window of (2N+1)×1 around the pixel (i, j) to be detected, pixels having the coordinates (i, j+n) and $-N \leq n \leq 0$ are pixels in the left window. The gray scale mean left_mean of pixels in the non-transitional zone in the left window is calculated by formulae (17), (18) and (19).

$$\text{left\_sum}(i, j) = \sum_{n=-N}^{-1} \alpha_n * I(i, j+n) \quad (17)$$

$$\text{left\_count}(i, j) = \sum_{n=-N}^{-1} \alpha_n \quad (18)$$

$$\text{left\_mean}(i, j) = \text{left\_sum}(i, j) / \text{left\_count}(i, j). \quad (19)$$

The left_sum in formula (17) is a sum of the gray scale of pixels in the non-transitional zone in the left window, the left_count in formula (18) is the number of the pixels in the non-transitional zone in the left window, and formula (19) calculates the gray scale mean of the pixels in the non-transitional zone.

Step 15: calculating a gray scale mean of pixels in the non-transitional zone in the right window by using the image I and the non-transitional zone identifier a.

In the local window of (2N+1)×1 around the pixel (i, j) to be detected, pixels having the coordinates (i, j+n) and $1 \leq n \leq N$ are pixels in the right window. The gray scale mean right_mean of pixels in the non-transitional zone in the right window is calculated by formulae (20), (21) and (22). The right_sum formula (20) is a sum of the gray scale of pixels in the non-transitional zone in the right window, the right_count in formula (21) is the number of the pixels in the non-transitional zone in the right window, and formula (22) calculates the gray scale mean of the pixels in the non-transitional zone in the right window.

$$\text{right\_sum}(i, j) = \sum_{n=1}^{N} \alpha_n * I(i, j+n) \quad (20)$$

$$\text{right\_count}(i, j) = \sum_{n=1}^{N} \alpha_n \quad (21)$$

$$\text{right\_mean}(i, j) = \text{right\_sum}(i, j) / \text{right\_count}(i, j) \quad (22)$$

Step 16: calculating the contrast C by using the gray scale mean left_mean of pixels in the non-transitional zone in the left window and the gray scale mean right_mean of pixels in the non-transitional zone in the right window, as shown by formula (23)

$$C(i,j) = |\text{right\_mean}(i,j) - \text{left\_mean}(i,j)| \quad (23)$$

The low-contrast region detection module receives the contrast C calculated by the contrast calculating module to calculate the low-contrast region confidence R_LC. Low-contrast region detection is performed because the conventional motion detection methods will have the error of missed detection in low-contrast regions and result in the distortion of moving object tailing. It can be seen from FIGS. 4A and 4B that when the noise levels are the same ($\sigma_g^2 = 2$), and the contrast C is 8, the MAE distributions of the moving pixels and the still pixels substantially do not have any overlapping region, so a conventional noise adaptive motion detection method may be used, i.e. using 2 times or 3 times noise level as the motion detection threshold, without resulting in any detection error. But when the contrast C falls to 4, the MAE distribution of the moving pixels already has a large overlapping region with the MAE distribution of the still pixels, so if the conventional 2 times noise level is used for detection, a lot of errors of missed detection will occur. The present invention provides a method for detecting the low-contrast regions, then the contrast adaptive motion detection of the present invention can be used to avoid errors of missed detection.

Figure 6A:
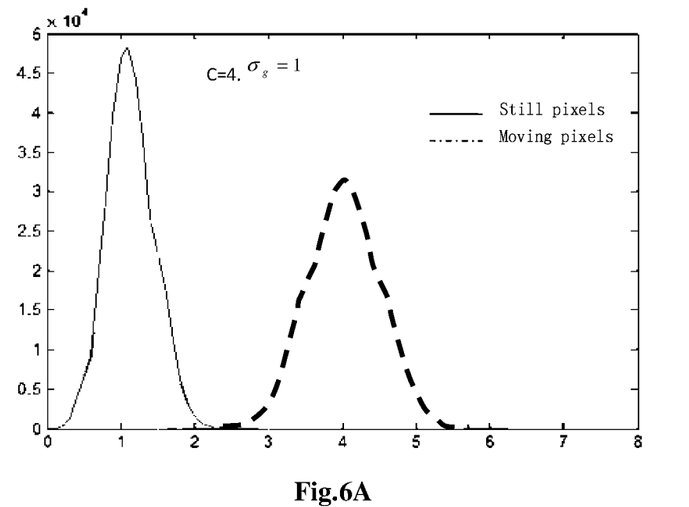
FIG. 6 shows examples of the distribution of MAE of still pixels and moving pixels.
Figure 6B:
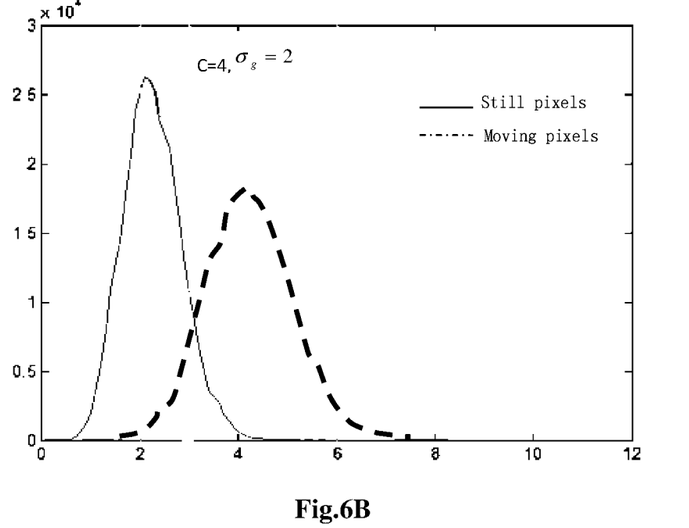

The low-contrast region detection method adopted in this embodiment not only uses the contrast for detection, but also uses the noise level for detection, so it is a noise adaptive low-contrast region detection method. The same contrast can bring different effects to motion detection in the cases of low noise and high noise, and the advantage of using the noise level adaptive detection method is that the influence of the noise can be eliminated. As shown in FIGS. 6A and 6B, when the contrast C=4 and the noise level is 1, there is no overlapping region between the still pixels and the moving pixels; however, when the contrast C is also 4 and the noise level is 2, there is an overlapping region between the still pixels and the moving pixels, as shown in FIG. 6B, and if the convention 2 times noise level is used for detection, there must be a lot of errors of missed detection.

The method for the noise adaptive low-contrast region detection comprises the following steps:

Step 21: calculating a contrast-to-noise ratio X, as shown by formula (25)

$$X(i, j) = \frac{C(i, j)}{\sigma_g} \qquad (25)$$

Figure 7A:
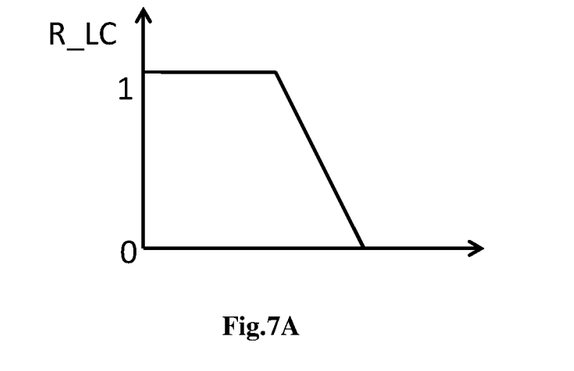
FIG. 7 shows examples of the relationship between R_LC and X.
Figure 7B:
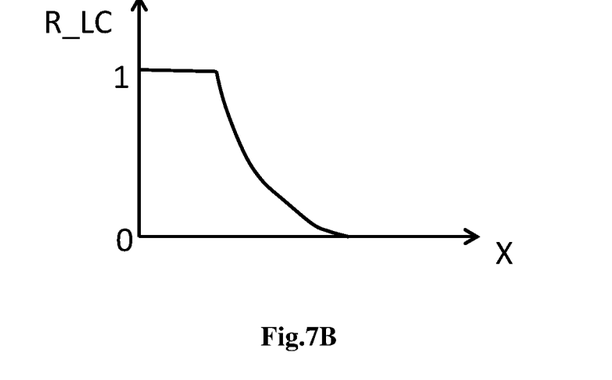

Step 22: calculating a low-contrast region confidence R_LC from the contrast-to-noise ratio X. FIGS. 7A and 7B show two curves for calculating R_LC. Thresholds X1 and X2 are preset, wherein X2<X1. When X(i,j)≤X2, the confidence R_LC is 1, when X2<X(i,j)<X1, the confidence R_LC monotonically decreases from 1 to 0 as the contrast-to-noise ratio X(i, j) increases, and when X1≤X(i,j), the confidence R_LC is 0.

Figure 7C:
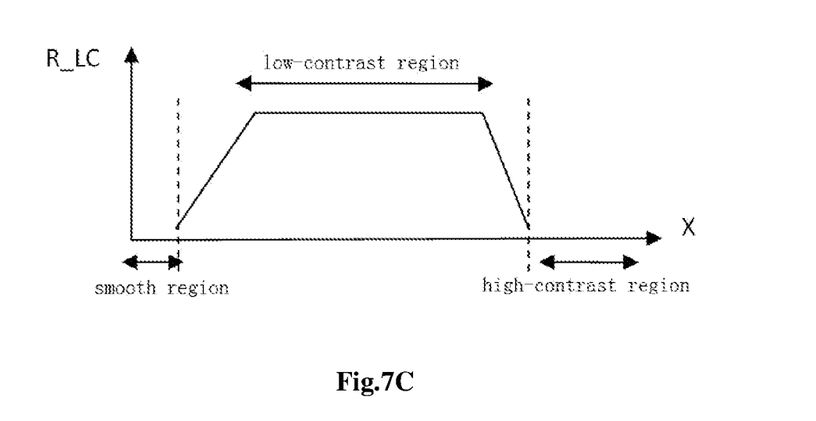

FIG. 7C shows another curve for calculating R_LC, which excludes the influence of the smooth region. In particular, thresholds X1, X2, X3 and X4 are preset, wherein X4<X3<X2<X1. When X(i,j)≤X4, the confidence R_LC is 0; when X4<X(i,j)<X3, the confidence R_LC monotonically increases from 0 to 1 as the contrast-to-noise ratio X increases; when X3≤X(i,j)≤X2, the confidence R_LC is 1; when X2<X(i,j)<X1, the confidence R_LC monotonically decreases from 1 to 0 as the contrast-to-noise ratio X increases; and when X1≤X(i,j), the confidence is 0.

The motion detection module receives input of the inter-frame difference m calculated by the inter-frame difference calculating module and the low-contrast region confidence R_LC calculated by the low-contrast region detection module to perform contrast adaptive motion detection and output a motion probability. In a region with a big low-contrast region confidence (i.e R_LC), there is a large overlapping region between the statistical distributions of the moving pixels and still pixels, and the distortion of moving object tailing cauesd by the errors of missed detection looks more serious than the incomplete removal of noises caused by the false alarm errors, so in the low-contrast region, the present invention uses the low-contrast region confidence to adjust parameters for motion detection so as to control occurrence of errors of missed detection.

Figure 8:
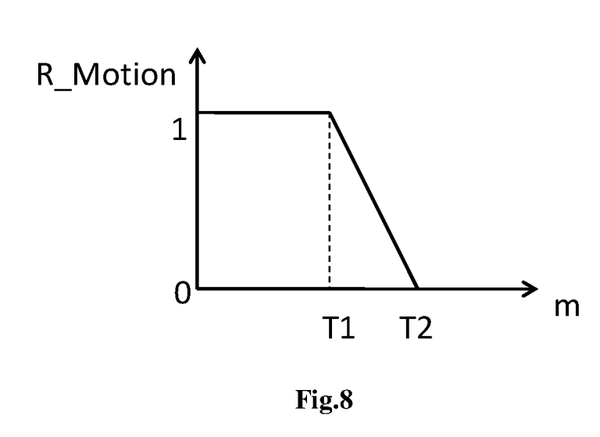
FIG. 8 shows an example curve of soft threshold motion detection.

Suppose that the output of the motion detection module is motion probability R_Motion, FIG. 8 shows a method for motion detection, wherein T1 and T2 are soft thresholds for motion detection. When m(i,j)<T1, the motion probability R_Motion of the pixel is 1, when T1≤m(i,j)≤T2, the motion probability R_Motion of the pixel monotonically decreases from 1 to 0 as the inter-frame difference m increases, and when T2<m(i,j), the motion probability R_Motion of the pixel is 0.

The parameters for the motion detection are adjusted by means of the low-contrast region confidence. In the low-contrast region, the parameters for the motion detection are adjusted to encourage pixels to be detected as moving pixels, thereby reducing the rate of missed detection. If the motion detection method as shown in FIG. 8 is adopted, the adjusting method is to reduce the motion detection threshold, as shown by formulae (26) and (27)

$$T1(i,j) = (1 - \alpha R\_LC(i,j)) * T1_{Preset} \qquad (26)$$

$$T2(i,j) = (1 - \beta R\_LC(i,j)) * T2_{Preset} \qquad (27)$$

$T1_{Preset}$ and $T2_{Preset}$ are preset parameters for the motion detection, which can be set according to conventional motion detection methods, α and β are preset parameters, for example, α=0.5, β=0.5. Then in a high-contrast region, the low-contrast confidence R_LC(i,j)=0, then $T1(i, j)=T1_{Preset}$, $T2(i, j)=T2_{Preset}$, thus it can be degraded to the conventional motion detection method, which ensure that there are neither false alarm errors nor errors of missed detection in the high-contrast region, thereby ensuring good denoising effect. In the low-contrast region, the low-contrast confidence R_LC(i,j)=1, then $T1(i, j)=(1-\alpha)*T1_{Preset}$, $T2(i, j)=(1-\beta)*T2_{Preset}$, it can be seen that the threshold is decreased, thereby controlling the occurrence of errors of missed detection.

The motion adaptive temporal filtering module receives an input of the motion probability R_Motion calculated by the motion detection module, and an input of the current frame as well as the previous filtered frame in the frame memory, and performs the weighted filtering of the current frame and the previous filtered frame by reference to the motion probability. Temporal weighted filtering will be performed on pixels with a low motion probability but not on pixels with a high motion probability, thereby denoising the still region while avoiding moving object tailing and temporal blurring in the motion region.

What is claimed is:
1. A contrast adaptive video denoising system, which comprises a frame memory, an inter-frame difference calculating module, a motion detection module, a motion adaptive temporal filtering module, characterized in that said system further comprises: a contrast calculating module and a low-contrast region detection module; the contrast calculating module calculates and outputs a local contrast (C) of a current input frame (I); the low-contrast region detection module calculates and outputs a low-contrast region confidence (R_LC) according to the local contrast (C) of the current input frame (I); the motion detection module calculates and outputs a motion probability (R_Motion) of a pixel according to the low-contrast region confidence (R_LC) and an inter-frame difference output from the inter-frame difference calculating module;
wherein the contrast calculating module comprises a horizontal gradient calculating unit, a gradient threshold calculating unit, a transitional zone detection unit, a left mean calculating unit, a right mean calculating unit, and an absolute difference calculating unit; and
wherein the horizontal gradient calculating unit is to calculate a horizontal gradient image (G) of the current frame (I); the gradient threshold calculating unit calculates and outputs a gradient threshold (Gt) according to the horizontal gradient image (G); the transitional zone detection unit calculates and outputs a non-transitional zone identifier a of a pixel to be detected according to the horizontal gradient image (G) and the gradient threshold (Gt), and divides a local window around the pixel to be detected into a left window and a right window; the left mean calculating unit calculates and outputs a gray scale mean left mean of pixels in the non-transitional zone in the left window according to the current input frame and the non-transitional zone identifier a; the right mean calculating unit calculates and outputs a gray scale mean right mean of pixels in the non-transitional zone in the right window according to the current frame and the non-transitional zone identifier a; the absolute difference calculating unit calculates and outputs an absolute value of a difference between the gray scale mean left mean of pixels in the non-transitional zone in the left window and the gray scale mean right mean of pixels in the non-transitional zone in the right window to be used as the local contrast (C) of the current input frame (I).

2. The contrast adaptive video denoising system according to claim 1, characterized in that the horizontal gradient calculating unit uses a gradient operator or image convolution to calculate the horizontal gradient image (G).

3. The contrast adaptive video denoising system according to claim 2, characterized in that a method of calculating the gradient threshold (Gt) comprises the step of taking a local window of (2N+1)×1 pixels around the pixel (i, j) to be detected, and calculating a maximum gradient max_grad of the local window by the formula $$\text{max\_grad}(i, j) = \max_{j-N \leq n \leq j+N} G(i, n)$$

then calculating the gradient threshold (Gt) by the formula $$Gt(i,j) = W * \text{max\_grad}(i,j)$$

wherein W is a scale factor of the maximum gradient.

4. The contrast adaptive video denoising system according to claim 3, characterized in that the formula for calculating the non-transitional zone identifier a of the local window (2N+1)×1 of the pixel (i, j) to be detected is:

$$\alpha_n = \begin{cases} 1 & \text{if } G(i, j+n) < G_t(i, j) \\ 0 & \text{if } G(i, j+n) \geq G_t(i, j) \end{cases}.$$

5. The contrast adaptive video denoising system according to claim 4, characterized in that a method for calculating the gray scale mean left_mean of pixels in the non-transitional zone in the left window and the gray scale mean right_mean of pixels in the non-transitional zone in the right window comprises:

in the local window (2N+1)×1 of the pixel (i, j) to be detected in the current input frame (I), the coordinates of pixels in the window are represented by (i, j+n), pixels
with −N≤n≤0 are pixels in the left window, and pixels with 1≤n≤N are pixels in the right window;
the gray scale mean left_mean of pixels in the non-transitional zone in the left window is calculated by formulae $$\text{left\_sum}(i, j) = \sum_{n=-N}^{-1} \alpha_n * I(i, j+n)$$

$$\text{left\_count}(i, j) = \sum_{n=-N}^{-1} \alpha_n$$

$$\text{left\_mean}(i, j) = \text{left\_sum}(i, j) / \text{left\_count}(i, j)$$

wherein $\alpha_n$ is the non-transitional zone identifier of an $n^{th}$ pixel, left_sum is a sum of the gray scale value of pixels in the non-transitional zone in the left window, left_count is the number of the pixels in the non-transitional zone in the left window;
the gray scale mean right_mean of pixels in the non-transitional zone in the right window is calculated by formulae $$\text{right\_sum}(i, j) = \sum_{n=1}^{N} \alpha_n * I(i, j+n)$$

$$\text{left\_count}(i, j) = \sum_{n=-N}^{-1} \alpha_n$$

$$\text{left\_mean}(i, j) = \text{left\_sum}(i, j) / \text{left\_count}(i, j)$$

wherein right_sum is a sum of the gray scale value of pixels in the non-transitional zone in the right window, right_count is the number of the pixels in the non-transitional zone in the right window.

6. The contrast adaptive video denoising system according to claim 5, characterized in that the low-contrast region detection module calculates the low-contrast region confidence (R_LC) according to a contrast-to-noise ratio X, and the contrast-to-noise ratio X is calculated by the formula $$X(i, j) = \frac{C(i, j)}{\sigma_g}$$

wherein C(i,j) is the pixel contrast, and $\sigma_g$ is the noise level.

7. The contrast adaptive video denoising system according to claim 6, characterized in that a method of calculating the low-contrast region confidence (R_LC) according to the contrast-to-noise ratio X comprises the step of presetting thresholds X1 and X2, wherein X2<X1, when X(i,j)≤X2, the low-contrast region confidence (R_LC) is 1, when X2<X(i, j)<X1, the low-contrast region confidence (R_LC) monotonically decreases from 1 to 0 as the contrast-to-noise ratio X(i, j) increases, and when X1≤X(i,j), the low-contrast region confidence (R_LC) is 0.

8. The contrast adaptive video denoising system according to claim 7, characterized in that the method of calculating the low-contrast region confidence (R_LC) according to the contrast-to-noise ratio X comprises the step of setting thresholds X1, X2, X3 and X4, wherein X4<X3<X2<X1, when X(i,j)≤X4, the low-contrast region confidence (R_LC) is 0, when X4<X(i,j)<X3, the low-contrast region confidence (R_LC) monotonically increases from 0 to 1 as the contrast-to-noise ratio X increases, and when X3≤X(i,j)≤X2, the low-contrast region confidence (R_LC) is 1, when X2<X(i,j)<X1, the low-contrast region confidence (R_LC) monotonically decreases from 1 to 0 as the contrast-to-noise ratio X increases, and when X1≤X(i,j), the low-contrast region confidence (R_LC) is 0.

9. The contrast adaptive video denoising system according to claim 8, characterized in that the motion detection module calculates the motion probability of the output pixel by a soft threshold motion detection method, which comprises the following steps:

step 11: setting soft thresholds T1 and T2 for motion detection, $$T1(i,j) = (1-\alpha R\_LC(i,j)) * T1_{Preset}$$

$$T2(i,j) = (1-\beta R\_LC(i,j)) * T2_{Preset}$$

Wherein $\alpha$ and $\beta$ are preset fixed parameters, $T1_{Preset}$ and $T2_{Preset}$ are preset parameters for the motion detection;

step 12: calculating the motion probability of a pixel according to the inter-frame difference characteristic m:
when m(i,j)<T1, the motion probability of the pixel is 1, when T1≤m(i,j)≤T2, the motion probability of the pixel monotonically decreases from 1 to 0 as the inter-frame difference characteristic m increases, and when T2≤m(i,j), the motion probability of the pixel is 0.

10. The contrast adaptive video denoising system according to claim 9, characterized in that the motion adaptive temporal filtering module uses a motion adaptive temporal filtering method to filter the present input frame, which further comprises: setting a motion probability threshold (Q); and performing temporal weighted filtering of the present input frame and the previous filtered frame in the frame memory by reference to the motion probability (R_Motion), when R_Motion≤Q, the temporal weighted filtering is performed, when Q<R_Motion, temporal weighted filtering is not performed.

* * * * *